United States Patent
Yu et al.

(10) Patent No.: US 10,331,958 B2
(45) Date of Patent: Jun. 25, 2019

(54) METHOD AND APPARATUS FOR ACQUIRING INFORMATION

(71) Applicant: BAIDU ONLINE NETWORK TECHNOLOGY (BEIJING) CO., LTD., Beijing (CN)

(72) Inventors: Li Yu, Beijing (CN); Cheng Wang, Beijing (CN); Shiyu Song, Beijing (CN); Fangfang Dong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 22 days.

(21) Appl. No.: 15/891,184

(22) Filed: Feb. 7, 2018

(65) Prior Publication Data
US 2018/0341820 A1 Nov. 29, 2018

(30) Foreign Application Priority Data
May 25, 2017 (CN) .......................... 2017 1 0379088

(51) Int. Cl.
| | |
|---|---|
| G06K 9/00 | (2006.01) |
| G01S 17/93 | (2006.01) |
| G01S 17/89 | (2006.01) |
| G01S 17/48 | (2006.01) |
| G01S 17/02 | (2006.01) |
| G01S 17/42 | (2006.01) |
| G01S 7/48 | (2006.01) |
| G06K 9/20 | (2006.01) |

(52) U.S. Cl.
CPC ........ *G06K 9/00798* (2013.01); *G01S 7/4808* (2013.01); *G01S 17/023* (2013.01); *G01S 17/42* (2013.01); *G01S 17/48* (2013.01); *G01S 17/89* (2013.01); *G01S 17/936* (2013.01); *G06K 9/2036* (2013.01)

(58) Field of Classification Search
CPC .............. G06K 9/00798; G06K 9/2036; G01S 17/023; G01S 7/4808; G01S 17/42; G01S 17/936; G01S 17/48; G01S 17/89
USPC ........................................................ 382/104
See application file for complete search history.

(56) References Cited

U.S. PATENT DOCUMENTS

2005/0099637 A1* 5/2005 Kacyra ................ G01B 11/002
356/601

\* cited by examiner

*Primary Examiner* — Amandeep Saini
(74) *Attorney, Agent, or Firm* — Lathrop Gage LLP (57) ABSTRACT

The present disclosure discloses a method and apparatus for acquiring information. A specific embodiment of the method includes: collecting characteristic information of a road object, the characteristic information comprising: a position, in a world coordinate system, of laser points corresponding to the road object in a laser point cloud collected in an area where the road object is located, and a position in a reflectance map corresponding to a position of a control point of the road object in the world coordinate system; and determining whether a preset accuracy is acceptable based on a match between the characteristic information of the road object and a preset characteristic information of the road object, the preset accuracy comprising: a splicing accuracy of the spliced laser point cloud, an accuracy of the reflectance map, and an accuracy of the high-precision map.

9 Claims, 3 Drawing Sheets

METHOD AND APPARATUS FOR ACQUIRING INFORMATION

CROSS-REFERENCE TO RELATED APPLICATIONS

This application is related to and claims priority from Chinese Patent Application No. 201710379088.6, filed with the State Intellectual Property Office of the People's Republic of China (SIPO) on May 25, 2017, the entire disclosure of the Chinese application is hereby incorporated by reference.

TECHNICAL FIELD

The present disclosure relates to the field of computer technology, specifically to the field of electronic map, and more specifically to a method and apparatus for acquiring information.

BACKGROUND

Perceiving a driving environment of a vehicle is at the core of the autonomous driving technology. Vehicles rely on the spliced result of a laser point cloud pre-collected in the driving environment, a high-precision map and a reflectance map to perceive the driving environment. The spliced result of the laser point cloud collected in a constructed driving environment, the high-precision map and the reflectance map, assessing whether the accuracy of the spliced result of the laser point cloud, the high-precision map and the reflectance map meets the requirements, is of great importance to a follow-up determination as to whether the determination may be applied to the perception of the driving environment of the vehicle.

SUMMARY

The present disclosure provides a method and apparatus for acquiring information, in order to solve the technical problem mentioned in the foregoing Background section.

In a first aspect, the present disclosure provides a method for acquiring information, the method including: collecting characteristic information of a road object, the characteristic information including: a position, in a world coordinate system, of laser points corresponding to the road object in a laser point cloud collected in an area where the road object is located, and a position in a reflectance map corresponding to a position of a control point of the road object in the world coordinate system; and determining whether a preset accuracy is acceptable based on a match between the characteristic information of the road object and a preset characteristic information of the road object, the preset characteristic information including: a position of laser points in the world coordinate system corresponding to the road object in a spliced laser point cloud obtained by splicing in advance multiple frames of a laser point cloud collected in the area where the road object is located, a position of the control point of the road object in the reflectance map, and annotation data of the road object in a high-precision map, the preset accuracy including: a splicing accuracy of the spliced laser point cloud, an accuracy of the reflectance map, and an accuracy of the high-precision map.

In a second aspect, the present disclosure provides an apparatus for acquiring information, the apparatus including: a collection unit, configured for collecting characteristic information of a road object, the characteristic information including: a position, in a world coordinate system, of laser points corresponding to the road object in a laser point cloud collected in an area where the road object is located, and a position in a reflectance map corresponding to a position of a control point of the road object in the world coordinate system; and an assessment unit, configured for determining whether a preset accuracy is acceptable based on a match between the characteristic information of the road object and a preset characteristic information of the road object, the preset characteristic information including: a position of laser points in the world coordinate system corresponding to the road object in a spliced laser point cloud obtained by splicing in advance multiple frames of a laser point cloud collected in the area where the road object is located, a position of the control point of the road object in the reflectance map, and annotation data of the road object in a high-precision map, the preset accuracy including: a splicing accuracy of the spliced laser point cloud, an accuracy of the reflectance map, and an accuracy of the high-precision map.

By collecting characteristic information of a road object, the characteristic information including: a position, in a world coordinate system, of laser points corresponding to the road object in a laser point cloud collected in an area where the road object is located, and a position in a reflectance map corresponding to a position of a control point of the road object in the world coordinate system; and determining whether a preset accuracy is acceptable based on a match between the characteristic information of the road object and a preset characteristic information of the road object, the preset characteristic information including: a position of laser points in the world coordinate system corresponding to the road object in a spliced laser point cloud obtained by splicing in advance multiple frames of a laser point cloud collected in the area where the road object is located, a position of the control point of the road object in the reflectance map, and annotation data of the road object in a high-precision map, the preset accuracy including: a splicing accuracy of the spliced laser point cloud, an accuracy of the reflectance map, and an accuracy of the high-precision map, the method and apparatus for acquiring information provided by the present disclosure achieve a comprehensive assessment of the splicing accuracy of the spliced laser point cloud, the accuracy of the reflectance map and the accuracy of the high-precision map used for perceiving the driving environment of a vehicle.

BRIEF DESCRIPTION OF THE DRAWINGS

After reading detailed descriptions of non-limiting embodiments with reference to the following accompanying drawings, other features, objectives and advantages of the present invention will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
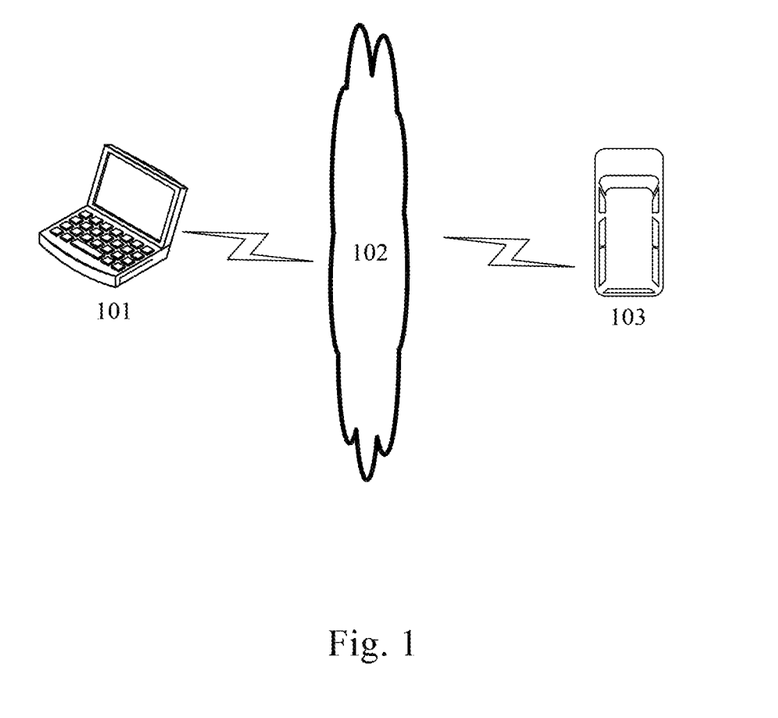
FIG. 1 is an exemplary system architecture of a method for acquiring information that may be applied to the present disclosure.

FIG. 1 is an exemplary system architecture of a method for acquiring information that may be applied to the present disclosure.

As shown in FIG. 1, the system architecture may include a terminal 101, a network 102, and a vehicle 103. The network 102 is used to provide a medium of communication links between the terminal 101 and the vehicle 103. The network 102 may employ a wireless communication link. The vehicle 103 may be configured with a three-dimensional laser scanner, a GPS, an inertial navigation device, and a centering rod may be configured on the GPS device. During the traveling of the vehicle 103, the vehicle 103 may respectively collect a position and an attitude angle of the center point of the 3D laser scanner by using the GPS and the inertial navigation. The vehicle 103 may collect a lane line, a stop line, etc. and other laser point clouds in an area where an road object is located using the three-dimensional laser scanner. The vehicle 103 may use the centering rod configured on the GPS device to align an angular point of the road object, such as the lane line and the stop line, and collect a position of the angular point of the road object in a world coordinate system. The vehicle 103 may transmit the collected data to the terminal 101.

Figure 2:
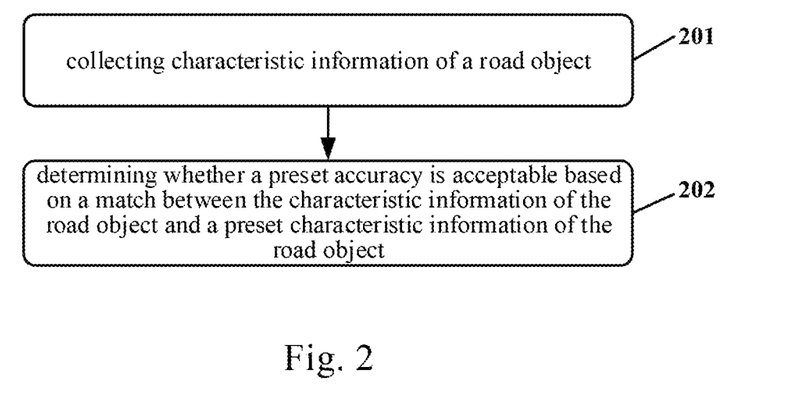
FIG. 2 shows a flowchart of an embodiment of the method for acquiring information according to the present disclosure.

Referring to FIG. 2, which shows a flow of an embodiment of the method for acquiring information according to the present disclosure. The method may be performed by a terminal such as the terminal 101 in FIG. 1, and accordingly, the apparatus may be disposed in the terminal such as the terminal 101 in FIG. 1. The method includes the following steps:

Step 201, collecting characteristic information of a road object.

In the present embodiment, a road object includes objects such as a lane line and a stop line on the road.

The characteristic information of the road object includes: a position, in a world coordinate system, of laser points corresponding to the road object in a laser point cloud collected in an area where the road object is located.

In the present embodiment, the world coordinate system may be a UTM (Universal Transverse Mercator) coordinate system. A position in the world coordinate system is a position in the real world. A control point of the road object may be the angular point of the road object.

For example, the characteristic information of the road object is collected by a traveling vehicle. When the vehicle is traveling to the area where the road object is located, a laser point cloud in the area where the road object is located may be collected by using a three-dimensional laser scanner configured on the vehicle, and the collected laser point cloud contains laser points corresponding to the road object, i.e., laser points formed by projecting a laser emitted by the three-dimensional laser scanner to the road object. The three-dimensional laser scanner scans for one round, then a frame of laser point cloud may be scanned, and the three-dimensional laser scanner may output coordinates of the laser points in the coordinate system of the three-dimensional laser scanner. A translation matrix may be obtained based on a coordinate of the center point of the three-dimensional laser scanner in the world coordinate system, and a rotation matrix may be obtained based on a roll angle, a pitch angle and a yaw angle of the center point of the three-dimensional laser scanner. Then, the coordinates of the laser points in the collected laser point cloud in the coordinate system of the three-dimensional laser scanner may be converted based on the rotation matrix and the translation matrix, to obtain coordinates of the laser points in the collected laser point cloud in the world coordinate system. Therefore, the positions of the laser points in the world coordinate system corresponding to the road object in the collected laser point cloud may be determined based on the coordinates of the laser points in the world coordinate system corresponding to the road object in the collected laser point cloud. The roll angle, the pitch angle and the yaw angle collected by the inertial navigation device on the vehicle may be used as the roll angle, the pitch angle and the yaw angle of the center point of the three-dimensional laser scanner. The three-dimensional laser scanner may be vertically connected to the GPS device, and the GPS device may output a coordinate of the center point of the GPS device in the world coordinate system. A coordinate obtained by subtracting a distance between the center point of the GPS device and the center point of the three-dimensional laser scanner from the coordinate of the center point of the GPS device in the world coordinate system may be taken as the coordinate of the center point of the three-dimensional laser scanner in the world coordinate system.

In the present embodiment, the preset characteristic information of the road object includes: a position of laser points in the world coordinate system corresponding to the road object in a spliced laser point cloud obtained by splicing in advance multiple frames of laser point cloud collected in the area where the road object is located.

For example, the multiple frames of laser point cloud collected in advance in the area where the road object is located is collected by a traveling vehicle. When the vehicle is traveling to the area where the road object is located, the multiple frames of laser point cloud may be collected by using the three-dimensional laser scanner configured on the vehicle, and the multiple frames of laser point cloud may all contain laser points formed by projecting the laser emitted by the three-dimensional laser scanner to the road object.

When splicing the multiple frames of laser point cloud, the coordinates of the laser points in each frame of laser point cloud in the multiple frames of laser point cloud in the three-dimensional laser scanner may be converted into coordinates in the world coordinate system. Then, the position of the center point of the three-dimensional laser scanner may be kept unchanged. Adjusting the roll angle, the pitch angle and the yaw angle of the center point of the three-dimensional laser scanner may be equivalent to rotating each frame of the laser point cloud, causing positions of laser points formed at the same position in the space scanned by the three-dimensional laser scanner in the multiple frames of laser point cloud coincide, thus, by splicing the multiple frames of laser point cloud, laser points corresponding to the positions in the same space in the laser points corresponding to the road object in the multiple frames of laser point cloud coincide, and a spliced laser point cloud is obtained.

In the present embodiment, the characteristic information of the road object includes: a position in a reflectance map corresponding to a position of a control point of the road object in the world coordinate system.

In the present embodiment, a coordinate of the control point of the road object in the world coordinate system may be collected, and the position of the road object in the world coordinate system may be determined based on the collected coordinate of the control point of the road object in the world coordinate system.

For example, the characteristic information of the road object is collected by a traveling vehicle, and the control point of the road object may be the angular point of the road object. When the vehicle is traveling to the area where the road object is located, the angular point of the road object may be aligned with the centering rod configured on the GPS device of the vehicle, and the coordinate of the control point of the road object in the world coordinate system is collected. The centering rod on the GPS device may be used to align the angular point of the lane line and the angular point of the stop line, and collect a coordinate of the angular point of the lane line in the world coordinate system and a coordinate of the angular point of the stop line in the world coordinate system. Thus, positions of the angular point of the lane line and the angular point of the stop line in the world coordinate system may be determined based on the coordinate of the angular point of the lane line in the world coordinate system and the coordinate of the angular point of the stop line in the world coordinate system.

In the present embodiment, a map area of the reflectance map may be the horizontal plane of the earth's surface, and the horizontal plane of the earth's surface is divided into blocks covering fixed geographical ranges. Each block may be subdivided into a number of square grids covering fixed geographical ranges, and each grid may cover a fixed geographical range. The laser points in the spliced laser point cloud obtained by splicing the multiple frames of laser point cloud collected in the area where the road object is located may be projected vertically to corresponding grids in the reflectance map, to obtain map data of the reflectance map. The map data of the reflectance map includes: a mean and a variance of the reflection intensity of all laser points projected to each grid, after the laser points in the spliced laser point cloud obtained by splicing the multiple frames of laser point cloud collected in the area where the road object is located are vertically projected to the corresponding grids.

In the present embodiment, a position corresponding to the collected control point of the road object after it is vertically projected to the reflectance map may be determined, based on values in the x-axis and the y-axis of the coordinate of the collected control point of the road object in the world coordinate system, and the position is used as the position in the reflectance map corresponding to the position of the collected control point of the road object in the world coordinate system. For example, the road object is a lane line, the control point of the lane line is the angular point of the lane line, the position corresponding to the angular point of the lane line after it is vertically projected to the reflectance map may be determined, based on values in the x-axis and the y-axis of the coordinate of the collected angular point of the lane line in the world coordinate system, and the position corresponding to the angular point of the lane line after it is vertically projected to the reflectance map is used as the position in the reflectance map corresponding to the position of the collected angular point of the lane line in the world coordinate system.

In the present embodiment, the preset characteristic information of the road object includes: a position of the control point of the road object in the reflectance map. The position of the control point of the road object in the reflectance map may be a position corresponding to, the laser point corresponding to the control point in the spliced laser point cloud obtained by splicing in advance the multiple frames of laser point cloud collected in the area where the road object is located after it is vertically projected to the reflectance map.

For example, the road object is a lane line, the control point of the road object is the angular point of the lane line, and the spliced laser point cloud obtained by splicing in advance the multiple frames of laser point cloud collected in the area where the road object is located contains laser points corresponding to the lane line, and the laser points corresponding to the lane line contain the laser point corresponding to the angular point of the lane line. The position of the angular point of the lane line in the reflectance map is a position corresponding to, the laser point corresponding to the angular point after it is vertically projected to the reflectance map, after the laser points in the spliced laser point cloud obtained by splicing are projected to the reflectance map.

In the present embodiment, the preset characteristic information of the road object includes: annotation data of the road object in a high-precision map. The annotation data of the road object in the high-precision map includes: a parametric equation of the road object, a position of the road object in the world coordinate system, a point marked on the road object, and a coordinate of the point marked on the road object in the world coordinate system.

In the present embodiment, when the high-precision map is constructed, the laser points corresponding to the road object in the spliced laser point cloud obtained by splicing in advance the multiple frames of laser point cloud collected in the area where the road object is located may be fitted to obtain the road object in the world coordinate system. For example, the road object is a lane line, and the laser points corresponding to the lane line in the spliced laser point cloud obtained by splicing the multiple frames of laser point cloud collected in the area where the lane line is located may be fitted to obtain the lane line in the world coordinate system, and then a parametric equation of the lane line and a position of the lane line in the world coordinate system may be determined. The high-precision map contains annotation data of the lane line, and the annotation data of the lane line includes: the parametric equation of the lane line, the position of the lane line in the world coordinate system, a point marked on the lane line, and a coordinate of the point marked on the lane line in the world coordinate system.

Step 202, determining whether a preset accuracy is acceptable based on a match between the characteristic information of the road object and a preset characteristic information of the road object.

In the present embodiment, it may be determined whether a splicing accuracy of the spliced laser point cloud obtained by splicing the multiple frames of laser point cloud collected in advance in the area where the road object is located is acceptable, based on a match between the position of the laser points corresponding to the road object in the laser point cloud collected in step 201 in the world coordinate system and the position of the laser points corresponding to the road object in the spliced laser point cloud obtained by splicing the multiple frames of laser point cloud collected in advance in the area where the road object is located in the world coordinate system.

In some alternative implementations of the present embodiment, laser points for matching may be selected from the laser points corresponding to the road object in the laser point cloud collected in step 201, and laser points corresponding to the selected laser points may be determined in the spliced laser point cloud. There may be more than one road objects, and a number of laser points may be selected from each road object respectively.

For example, the road objects are a plurality of lane lines and stop lines. A laser point cloud of the area where each lane line or stop line is located is collected by step 201, and the laser point cloud contains laser points corresponding to the lane line or the stop line. The laser points for matching may be selected respectively from the laser points corresponding to each lane line or stop line. The spliced laser point cloud contains laser points corresponding to the selected laser points. For example, the laser points for matching are laser points formed by projecting to the angular point of the road object. The spliced laser point cloud contains laser points corresponding to the laser points formed by projecting to the angular point. A distance between a position of each selected laser point in the world coordinate system and a position of the laser points corresponding to the selected laser points in the spliced laser point cloud in the world coordinate system may be calculated respectively, to obtain the distance between the position of each selected laser point in the world coordinate system and the position of the laser points corresponding to the selected laser points in the spliced laser point cloud in the world coordinate system. After the distance between the position of each selected laser point in the world coordinate system and the position of the laser points corresponding to the selected laser points in the spliced laser point cloud in the world coordinate system is obtained, a ratio of the number of laser points with a distance to laser points corresponding to the selected laser points in the laser points corresponding to the road object in the spliced laser point cloud in the selected laser points less than a preset distance and the total number of the selected laser points may be calculated, based on the ratio, it is determined whether the splicing accuracy of the spliced laser point cloud is acceptable.

For example, the preset distance includes: 5 cm, 10 cm, a ratio of the number of laser points with a distance between laser points corresponding to the selected laser points in the laser points corresponding to the road object in the spliced laser point cloud in the selected laser points less than 5 cm, 10 cm and the total number of the selected laser points may be calculated respectively. When the ratio of the number of laser points with a distance between laser points corresponding to the selected laser points in the laser points corresponding to the road object in the spliced laser point cloud in the selected laser points less than 5 cm and the total number of the selected laser points is greater than or equal to 99%, when the ratio of the number of laser points with a distance between laser points corresponding to the selected laser points in the laser points corresponding to the road object in the spliced laser point cloud in the selected laser points less than 10 cm and the total number of the selected laser points is greater than or equal to 99.9%, it may be determined that the splicing accuracy of the spliced laser point cloud is acceptable.

In the present embodiment, based on a match between the position in the reflectance map corresponding to the position of the control point of the road object collected in step 201 in the world coordinate system and the position of the control point of the road object in the reflectance map, it is determined whether the accuracy of the reflectance map is acceptable.

In some alternative implementations of the present embodiment, a distance between the position in the reflectance map corresponding to the position of the collected control point of each road object in the world coordinate system and the position of the control point of the road object in the reflectance map may be calculated respectively, a ratio of the number of control points with a distance between the position in the reflectance map corresponding to the position in the world coordinate system and the position of the control point of the road object in the reflectance map less than a width of a preset number of grids and the total number of the control points may be calculated, based on the ratio, it is determined whether the accuracy of the reflectance map is acceptable.

For example, the collected control point of the road object is the angular point of the road object, in step 201, after aligning angular points of a plurality road objects with the centering rod on the GPS device and collecting coordinates of the angular points of the plurality of road objects in the world coordinate system, the position in the reflectance map corresponding to the coordinate of each angular point of the angular points of the plurality of road objects in the world coordinate system may be determined. A distance between the position in the reflectance map corresponding to the position of each angular point in the world coordinate system and the position of the angular point in the reflectance map may be calculated respectively.

After the distance between the position in the reflectance map corresponding to the position of each angular point of the plurality of angular points collected in step 201 in the world coordinate system and the position of the angular point in the reflectance map is calculated, a ratio of the number of angular points with a distance between the position in the reflectance map corresponding to the position in the world coordinate system and the position of the angular points in the reflectance map less than a width of a preset number of grids in the reflectance map and the total number of the angular points may be calculated, based on the ratio, it is determined whether the accuracy of the reflectance map is acceptable.

For example, the preset number includes: 1, 2 and 3. When the ratio of the number of angular points with the distance between the position in the reflectance map corresponding to the position of the plurality of angular points collected in step 201 in the world coordinate system and the position of the angular points in the reflectance map less than the width of one grid and the total number of the angular points is greater than 95%, the ratio of the number of angular points with the distance between the position in the reflectance map corresponding to the position in the world coordinate system and the position of the angular points in the reflectance map less than the width of two grids and the total number of the angular points is greater than 99%, the ratio of the number of angular points with the distance between the position in the reflectance map corresponding to the position in the world coordinate system and the position of the angular points in the reflectance map less than the width of three grids and the total number of the angular points is greater than 99%, it may be determined that the accuracy of the reflectance map is acceptable.

In the present embodiment, the road object in the world coordinate system may be determined based on the parametric equation of the road object in the annotation data of the road object in the high-precision map and the position of the road object in the world coordinate system.

In some alternative implementations of the present embodiment, it may be determined whether the accuracy of the high-precision map is acceptable, based on the distance between the position of the control point of each road object collected in step 201 in the world coordinate system and the road object in the world coordinate system closest to the position of the control point in the world coordinate system.

For example, the collected control point of the road object is the angular point of the road object. In step 201, after aligning angular points of a plurality road objects with the centering rod on the GPS device and collecting coordinates of the angular points of the plurality of road objects in the world coordinate system, the position of the angular point of each road object in the angular points of the plurality of road objects in the world coordinate system may be determined. The distance from the position of each angular point to the road object in the world coordinate system closest to the angular point may be calculated respectively, and a plurality of distances may be obtained. Then, a distance mean and a distance variance of the plurality of distances may be calculated. Based on the relative magnitude of the distance mean and the distance variance and a preset mean and a preset variance, it may be determined that whether the accuracy of the high-precision map is acceptable. For example, when the distance mean is less than the preset mean and the distance variance is less than the preset variance, it may be determined that the accuracy of the high-precision map is acceptable.

In the present embodiment, a ratio of the number of control points with a distance to the road object in the world coordinate system closest to the control points in the plurality of control points collected in step 201 less than a preset distance and the total number of the control points may be calculated. Based on the ratio, it is determined that whether the accuracy of the high-precision map is acceptable. For example, the preset distance includes 10 cm and 15 cm, ratios of the number of control points with a distance to the road object in the world coordinate system closest to the control points less than 10 cm and 15 cm and the total number of the control points may be calculated respectively, when the ratio of the number of control points with a distance to the road object in the world coordinate system closest to the control points less than 10 cm and the total number of the control points is greater than or equal to 99%, when the ratio of the number of control points with a distance to the road object in the world coordinate system closest to the control points less than 15 cm and the total number of the control points is greater than or equal to 99.9%, it may be determined that the accuracy of the high-precision map is acceptable.

In some alternative implementations of the present embodiment, a position in the reflectance map corresponding to the position of each marked point on the road object in the world coordinate system may be determined, based on the position of each marked point on the road object in the annotation data of the road object in the high-precision map in the world coordinate system. Then, a distance between the position in the reflectance map corresponding to the position of each marked point on the road object in the world coordinate system and the center line of the road object in the reflectance map may be calculated. A ratio of the number of annotated points with a distance to the center line of the road object in the reflectance map less than the width of a preset number of grids and the total number of the annotated points may be calculated, based on the ratio, it is determined whether the annotated accuracy of the high-precision map is acceptable.

For example, the road object is the lane line, the annotation data of the lane line in the high-precision map contains a coordinate of a point marked on the lane line in the world coordinate system, a position of the point marked on the lane line in the world coordinate system may be determined based on the coordinate of the point marked on the lane line in the world coordinate system, and a position in the reflectance map corresponding to the position of the point marked on the lane line in the world coordinate system may be further determined. In the reflectance map, the width of the lane line in the reflectance map may be determined based on a corresponding position after the laser points corresponding to the lane line are projected on the reflectance map. The width of the lane line in the reflectance map occupies a certain number of grids. A line of the middle grid in the grids occupied by the width perpendicular to the lane line in the reflectance map may be taken as the center line of the lane line in the reflectance map. The distance between the position in the reflectance map corresponding to the position of the point marked on each lane line in the world coordinate system and the center line of the lane line in the reflectance map may be calculated. Then, a ratio of the number of points marked with a distance to the center line of the lane line in the reflectance map less than the width of a preset number of grids and the total number of the points marked may be calculated, based on the ratio, it is determined whether the marking accuracy of the high-precision map is acceptable. For example, the preset number includes: 1, 2 and 3, when the ratio of the points marked on the lane line with a distance to the center line of the lane line in the reflectance map less than the width of one grid and the total number of the points marked on the lane line is greater than or equal to 95%, the ratio of the points marked on the lane line with a distance to the center line of the lane line in the reflectance map less than the width of 2 grids and the total number of the points marked on the lane line is greater than or equal to 99%, the ratio of the points marked on the lane line with a distance to the center line of the lane line in the reflectance map less than the width of 3 grids and the total number of the points marked on the lane line is greater than or equal to 99.99%, it may be determined that the marking accuracy of the high-precision map is acceptable.

Figure 3:
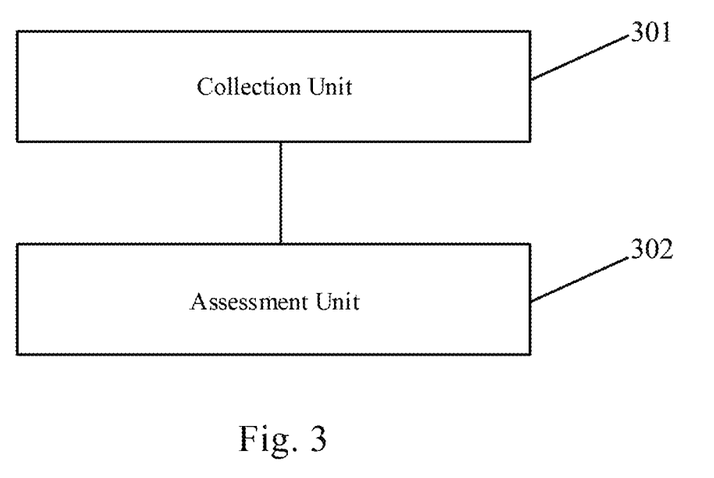
FIG. 3 shows a schematic structural diagram of an embodiment of the apparatus for acquiring information according to the present disclosure.

Referring to FIG. 3, which shows a schematic structural diagram of an embodiment of the apparatus for acquiring information according to the present disclosure, the apparatus for acquiring information includes: a collection unit 301 and an assessment unit 302. Here, the collection unit 301 is configured for collecting characteristic information of a road object, the characteristic information including: a position, in a world coordinate system, of laser points corresponding to the road object in a laser point cloud collected in an area where the road object is located, and a position in a reflectance map corresponding to a position of a control point of the road object in the world coordinate system. The assessment unit 302 is configured for determining whether a preset accuracy is acceptable based on a match between the characteristic information of the road object and a preset characteristic information of the road object, the preset characteristic information including: a position of laser points in the world coordinate system corresponding to the road object in a spliced laser point cloud obtained by splicing in advance multiple frames of a laser point cloud collected in the area where the road object is located, a position of the control point of the road object in the reflectance map, and annotation data of the road object in a high-precision map, the preset accuracy including: a splicing accuracy of the spliced laser point cloud, an accuracy of the reflectance map, and an accuracy of the high-precision map.

In some alternative implementations of the present embodiment, the assessment unit 302 includes: a splicing accuracy assessment subunit, configured for selecting laser points for matching from the laser points corresponding to the road object in the laser point cloud collected in the area where the road object is located; calculating, respectively, a distance between each of the selected laser points and a laser point corresponding to the selected laser point in the laser points corresponding to the road object in the spliced laser point cloud; calculating, a ratio of a number of laser points having distances between the laser points corresponding to the selected laser points in the laser points corresponding to the road object in the spliced laser point cloud in the selected laser points less than a preset distance and a total number of the selected laser points; and determining whether a splicing accuracy of the spliced laser point cloud is acceptable based on the ratio; a reflectance map accuracy assessment subunit, configured for: determining respectively, when the control point of the road object is an angular point of the road object, a position in the reflectance map corresponding to a position of a collected angular point of each road object in the world coordinate system; calculating respectively, a distance between the position in the reflectance map corresponding to the position of the angular point of the each road object in the world coordinate system and the angular point of the road object in the reflectance map; calculating, a ratio of a number of angular points having a distance between the position in the reflectance map corresponding to the position in the world coordinate system and the position of the angular point in the reflectance map less than a width of a preset number of grids in the reflectance map and a total number of the angular points; and determining whether an accuracy of the reflectance map is acceptable based on the ratio; and a high-precision map accuracy assessment subunit, configured for: determining respectively, when the control point of the road object is an angular point of the road object, a road object in the world coordinate system closest to a position of a collected angular point of each road object, respectively based on the position of the collected angular point of the each road object in the world coordinate system and the annotation data of the road object in the high-precision map, and the annotation data of the road object including: a parametric equation of the road object, a position of the road object in the world coordinate system, a point marked on the road object, and a coordinate of the point marked on the road object in the world coordinate system; calculating respectively, a distance between the position of the angular point of the each road object in the world coordinate system and a road object in the world coordinate system closest to the angular point of the road object, to obtain a plurality of distances; calculating a mean and a variance of the plurality of distances to obtain a distance mean and a distance variance; and determining whether an accuracy of the high-precision map is acceptable, based on a comparison result of the distance mean and the distance variance with a mean threshold and a variance threshold.

In some alternative implementations of the present embodiment, the apparatus for acquiring information further includes: a marking accuracy assessment unit, configured for acquiring respectively, a position of each marked point on the road object in the annotation data of the road object in the high-precision map in the world coordinate system; determining respectively, a position in the reflectance map corresponding to the position of the each marked point on the road object in the world coordinate system; calculating respectively, a distance between the position in the reflectance map corresponding to the position of the each marked point on the road object in the world coordinate system and a center line of the road object in the reflectance map; calculating a ratio of a number of marked points having a distance to the center line of the road object in the reflectance map less than a width of a preset number of grids and a total number of the marked points; and determining whether a marking accuracy of the high-precision map is acceptable based on the ratio.

The present disclosure also provides a terminal, which may include the apparatus for acquiring information described in the embodiment corresponding to FIG. 3. The terminal may be provided with one or more processors; a storage, configured to store one or more programs, and the one or more programs may include instructions to perform operation described in the above steps 201-202. When the one or more programs being executed by the one or more processors, cause the one or more processors to perform the operation described in the above steps 201-202.

The present disclosure further provides a non-volatile computer readable medium, which may be included in the terminal, or may exist alone without being incorporated into the terminal. The non-volatile computer readable medium carries one or more programs that, when executed by the terminal, cause the terminal to: collect characteristic information of a road object, the characteristic information including: a position, in a world coordinate system, of laser points corresponding to the road object in a laser point cloud collected in an area where the road object is located, and a position in a reflectance map corresponding to a position of a control point of the road object in the world coordinate system; and determine whether a preset accuracy is acceptable based on a match between the characteristic information of the road object and a preset characteristic information of the road object, the preset characteristic information including: a position of laser points in the world coordinate system corresponding to the road object in a spliced laser point cloud obtained by splicing in advance multiple frames of a laser point cloud collected in the area where the road object is located, a position of the control point of the road object in the reflectance map, and annotation data of the road object in a high-precision map, the preset accuracy including: a splicing accuracy of the spliced laser point cloud, an accuracy of the reflectance map, and an accuracy of the high-precision map.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for acquiring information, the method comprising:
    collecting characteristic information of a road object, the characteristic information comprising: a position, in a world coordinate system, of laser points corresponding to the road object in a laser point cloud collected in an area where the road object is located, and a position in a reflectance map corresponding to a position of a control point of the road object in the world coordinate system; and
    determining whether a preset accuracy is acceptable based on a match between the characteristic information of the road object and a preset characteristic information of the road object, the preset characteristic information comprising: a position of laser points in the world coordinate system corresponding to the road object in a spliced laser point cloud obtained by splicing in advance multiple frames of a laser point cloud collected in the area where the road object is located, a position of the control point of the road object in the reflectance map, and annotation data of the road object in a high-precision map, the preset accuracy comprising: a splicing accuracy of the spliced laser point cloud, an accuracy of the reflectance map, and an accuracy of the high-precision map.

2. The method according to claim 1, wherein the determining whether a preset accuracy is acceptable based on a match between the characteristic information of the road object and a preset characteristic information of the road object comprises:
    selecting laser points for matching from the laser points corresponding to the road object in the laser point cloud collected in the area where the road object is located;
    calculating, respectively, a distance between each of the selected laser points and a laser point corresponding to the selected laser point in the laser points corresponding to the road object in the spliced laser point cloud;
    calculating, a ratio of a number of laser points having distances between the laser points corresponding to the selected laser points in the laser points corresponding to the road object in the spliced laser point cloud in the selected laser points less than a preset distance and a total number of the selected laser points; and
    determining whether a splicing accuracy of the spliced laser point cloud is acceptable based on the ratio.

3. The method according to claim 1, wherein the control point of the road object is an angular point of the road object; and
    the determining whether a preset accuracy is acceptable based on a match between the characteristic information of the road object and a preset characteristic information of the road object comprises:
    determining respectively, a position in the reflectance map corresponding to a position of a collected angular point of each road object in the world coordinate system;
    calculating respectively, a distance between the position in the reflectance map corresponding to the position of the angular point of the each road object in the world coordinate system and the angular point of the road object in the reflectance map;
    calculating, a ratio of a number of angular points having a distance between the position in the reflectance map corresponding to the position in the world coordinate system and the position of the angular point in the reflectance map less than a width of a preset number of grids in the reflectance map and a total number of the angular points; and
    determining whether an accuracy of the reflectance map is acceptable based on the ratio.

4. The method according to claim 1, wherein the control point of the road object is an angular point of the road object; and
    the determining whether a preset accuracy is acceptable based on a match between the characteristic information of the road object and a preset characteristic information of the road object comprises:
    determining respectively, a road object in the world coordinate system closest to a position of a collected angular point of each road object, respectively based on the position of the collected angular point of the each road object in the world coordinate system and the annotation data of the road object in the high-precision map, and the annotation data of the road object comprising: a parametric equation of the road object, a position of the road object in the world coordinate system, a point marked on the road object, and a coordinate of the point marked on the road object in the world coordinate system;
    calculating respectively, a distance between the position of the angular point of the each road object in the world coordinate system and a road object in the world coordinate system closest to the angular point of the road object, to obtain a plurality of distances;
    calculating a mean and a variance of the plurality of distances to obtain a distance mean and a distance variance; and
    determining whether an accuracy of the high-precision map is acceptable, based on a comparison result of the distance mean and the distance variance with a mean threshold and a variance threshold.

5. The method according to claim 1, the method further comprising:
    acquiring respectively, a position of each marked point on the road object in the annotation data of the road object in the high-precision map in the world coordinate system;
    determining respectively, a position in the reflectance map corresponding to the position of the each marked point on the road object in the world coordinate system;
    calculating respectively, a distance between the position in the reflectance map corresponding to the position of the each marked point on the road object in the world coordinate system and a center line of the road object in the reflectance map;
    calculating a ratio of a number of marked points having a distance to the center line of the road object in the reflectance map less than a width of a preset number of grids and a total number of the marked points; and determining whether a marking accuracy of the high-precision map is acceptable based on the ratio.

6. An apparatus for acquiring information, the apparatus comprising:
at least one processor; and
a memory storing instructions, the instructions when executed by the at least one processor, cause the at least one processor to perform operations, the operations comprising:
collecting characteristic information of a road object, the characteristic information comprising: a position, in a world coordinate system, of laser points corresponding to the road object in a laser point cloud collected in an area where the road object is located, and a position in a reflectance map corresponding to a position of a control point of the road object in the world coordinate system; and
determining whether a preset accuracy is acceptable based on a match between the characteristic information of the road object and a preset characteristic information of the road object, the preset characteristic information comprising: a position of laser points in the world coordinate system corresponding to the road object in a spliced laser point cloud obtained by splicing in advance multiple frames of a laser point cloud collected in the area where the road object is located, a position of the control point of the road object in the reflectance map, and annotation data of the road object in a high-precision map, the preset accuracy comprising: a splicing accuracy of the spliced laser point cloud, an accuracy of the reflectance map, and an accuracy of the high-precision map.

7. The apparatus according to claim 6, wherein determining whether a preset accuracy is acceptable based on a match between the characteristic information of the road object and a preset characteristic information of the road object comprises:
selecting laser points for matching from the laser points corresponding to the road object in the laser point cloud collected in the area where the road object is located; calculating, respectively, a distance between each of the selected laser points and a laser point corresponding to the selected laser point in the laser points corresponding to the road object in the spliced laser point cloud; calculating, a ratio of a number of laser points having distances between the laser points corresponding to the selected laser points in the laser points corresponding to the road object in the spliced laser point cloud in the selected laser points less than a preset distance and a total number of the selected laser points; and determining whether a splicing accuracy of the spliced laser point cloud is acceptable based on the ratio;
determining respectively, when the control point of the road object is an angular point of the road object, a position in the reflectance map corresponding to a position of a collected angular point of each road object in the world coordinate system; calculating respectively, a distance between the position in the reflectance map corresponding to the position of the angular point of the each road object in the world coordinate system and the angular point of the road object in the reflectance map; calculating, a ratio of a number of angular points having a distance between the position in the reflectance map corresponding to the position in the world coordinate system and the position of the angular point in the reflectance map less than a width of a preset number of grids in the reflectance map and a total number of the angular points; and determining whether an accuracy of the reflectance map is acceptable based on the ratio; and determining respectively, when the control point of the road object is an angular point of the road object, a road object in the world coordinate system closest to a position of a collected angular point of each road object, respectively based on the position of the collected angular point of the each road object in the world coordinate system and the annotation data of the road object in the high-precision map, and the annotation data of the road object comprising: a parametric equation of the road object, a position of the road object in the world coordinate system, a point marked on the road object, and a coordinate of the point marked on the road object in the world coordinate system; calculating respectively, a distance between the position of the angular point of the each road object in the world coordinate system and a road object in the world coordinate system closest to the angular point of the road object, to obtain a plurality of distances; calculating a mean and a variance of the plurality of distances to obtain a distance mean and a distance variance; and determining whether an accuracy of the high-precision map is acceptable, based on a comparison result of the distance mean and the distance variance with a mean threshold and a variance threshold.

8. The apparatus according to claim 7, wherein the operations further comprise:
acquiring respectively, a position of each marked point on the road object in the annotation data of the road object in the high-precision map in the world coordinate system;
determining respectively, a position in the reflectance map corresponding to the position of the each marked point on the road object in the world coordinate system;
calculating respectively, a distance between the position in the reflectance map corresponding to the position of the each marked point on the road object in the world coordinate system and a center line of the road object in the reflectance map;
calculating a ratio of a number of marked points having a distance to the center line of the road object in the reflectance map less than a width of a preset number of grids and a total number of the marked points; and
determining whether a marking accuracy of the high-precision map is acceptable based on the ratio.

9. A non-transitory computer storage medium storing a computer program, the computer program when executed by one or more processors, causes the one or more processors to perform operations, the operations comprising:
collecting characteristic information of a road object, the characteristic information comprising: a position, in a world coordinate system, of laser points corresponding to the road object in a laser point cloud collected in an area where the road object is located, and a position in a reflectance map corresponding to a position of a control point of the road object in the world coordinate system; and
determining whether a preset accuracy is acceptable based on a match between the characteristic information of the road object and a preset characteristic information of the road object, the preset characteristic information comprising: a position of laser points in the world coordinate system corresponding to the road object in a spliced laser point cloud obtained by splicing in advance multiple frames of a laser point cloud collected in the area where the road object is located, a position of the control point of the road object in the reflectance map, and annotation data of the road object in a high-precision map, the preset accuracy comprising: a splicing accuracy of the spliced laser point cloud, an accuracy of the reflectance map, and an accuracy of the high-precision map.

* * * * *